United States Patent
Nagano et al.

(10) Patent No.: US 7,367,716 B2
(45) Date of Patent: May 6, 2008

(54) LASER APPARATUS AND METHOD FOR ASSEMBLING THE LASER APPARATUS

(75) Inventors: Kazuhiko Nagano, Kanagawa-ken (JP); Yuichi Teramura, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 51 days.

(21) Appl. No.: 11/385,801

(22) Filed: Mar. 22, 2006

(65) Prior Publication Data

US 2006/0215967 A1    Sep. 28, 2006

(30) Foreign Application Priority Data

Mar. 22, 2005 (JP) ............................. 2005/082178

(51) Int. Cl.
*G02B 6/36* (2006.01)
(52) U.S. Cl. ........................................ 385/89
(58) Field of Classification Search ............ 385/88–95, 385/147; 372/34, 36, 43.01–50.23
See application file for complete search history.

(56) References Cited

U.S. PATENT DOCUMENTS 6,116,792 A * 9/2000 Kosugi ........................ 385/92

6,995,912 B2   2/2006 Okazaki
2004/0247011 A1 * 12/2004 Okazaki et al. ............. 372/108

FOREIGN PATENT DOCUMENTS

JP        2004-134641 A      4/2004

* cited by examiner

*Primary Examiner*—Quyen P Leung
(74) *Attorney, Agent, or Firm*—Sughrue Mion, PLLC

(57) ABSTRACT

In a laser apparatus: an adhesion surface and a first reference surface making a first predetermined angle with the adhesion surface are formed on an attachment part, and a mounting surface and a second reference surface making a second predetermined angle with the mounting surface are formed on a fixing member which is directly or indirectly fixed to a main body and arranged to adhesively hold the attachment part. In a method for assembling the laser apparatus: a first angle between the second reference surface and a reference direction is measured; the orientation of the attachment part is adjusted while measuring a second angle between the first reference surface and the reference direction; and the attachment part is adhesively fixed to the fixing member when the second angle is equal to an angle predetermined based on the first angle and the first and second predetermined angles.

17 Claims, 7 Drawing Sheets

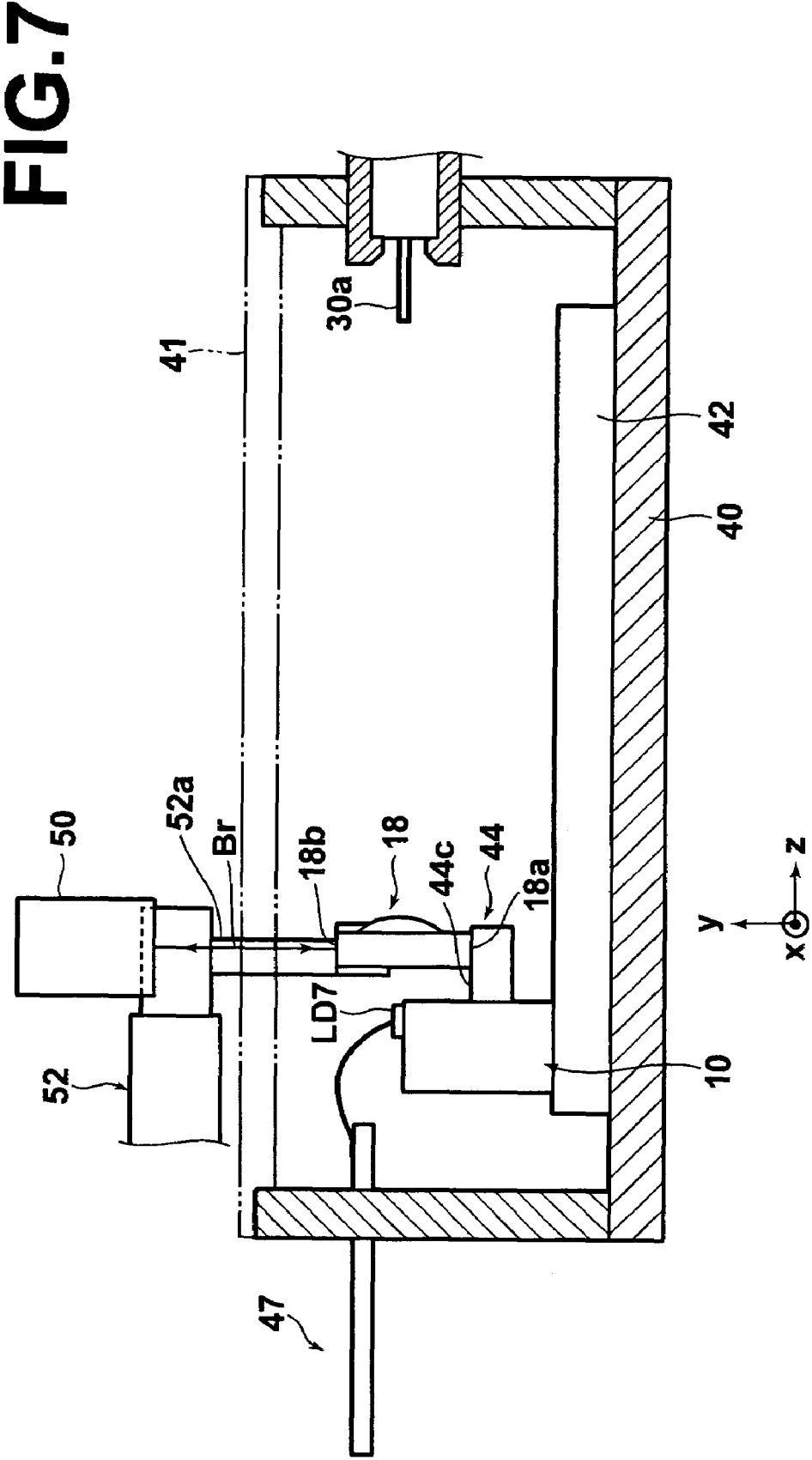

LASER APPARATUS AND METHOD FOR ASSEMBLING THE LASER APPARATUS

BACKGROUND OF THE INVENTION

1. Field of the Invention

The present invention relates to a laser apparatus in which one or more optical components (including, for example, a condensing lens) and one or more holders for the one or more optical components are directly or indirectly fixed to a main body by adhesion. The present invention also relates to a method for assembling the above laser apparatus.

2. Description of the Related Art

Some known types of laser apparatuses optically combine a plurality of laser beams in a single optical fiber, and output a high-power laser beam by inputting the plurality of laser beams into the single optical fiber. For example, such laser apparatuses are disclosed in U.S. Pat. No. 6,995,912 and Japanese Unexamined Patent Publication No. 2004-134641. The disclosed laser apparatuses are basically constituted by one or more semiconductor lasers which emit a plurality of laser beams, a single optical fiber, and an optical condensing system which condenses the plurality of laser beams, and couples the condensed laser beams to the optical fiber.

In the above laser apparatuses, the dimensions of the optical components including collimator lenses and a condensing lens (which constitute an optical condensing system) and the holders (which hold the optical components) are normally very small. Conventionally, in order to fix the above small parts to the main body of the laser apparatus, fixing structures using an adhesive are widely used, for example, as indicated in Japanese Unexamined Patent Publication No. 2004-134641.

However, in the conventional structures in which small optical components and holders are fixed to a main body of an apparatus as mentioned above, the positions in which the optical components and holders are fixed are likely to be inclined from desired positions.

The above problem is explained in detail below by taking as examples laser apparatuses in which semiconductor lasers, an optical condensing system, and a near-end portion of an optical fiber on the light-entrance side are arranged in a package.

In the first example of the laser apparatus, the near-end portion of the optical fiber is fixed in such a manner that the core axis of the near-end portion is parallel to the bottom surface of the package, a holder having a rectangular parallelepipedic shape and being arranged to fix a lens is fixed on the bottom surface of the package, and a condensing lens is adhesively fixed on the upper surface of the holder in such a manner that the core axis of the near-end portion of the optical fiber coincides with the optical axis of the condensing lens. The condensing lens is a truncated lens having a shape obtained by cutting out a portion of an axisymmetric round lens with planes parallel to the optical axis of the condensing lens, and a surface of the condensing lens exposed by cutting with a plane becomes an adhesion surface. Thus, the condensing lens is fixed to the upper surface of the holder in such a manner that the adhesion surface of the condensing lens is in contact with the upper surface of the holder.

In order to make the optical axis of the condensing lens coincide with the core axis of the near-end portion of the optical fiber when the above condensing lens is adhesively fixed, it is necessary that the optical axis of the condensing lens be parallel to the bottom surface of the package. It may be considered that the optical axis of the condensing lens will be set parallel to the bottom surface of the package by simply pressing the condensing lens against the upper surface of the holder (i.e., by letting the adhesion surface of the condensing lens fit the upper surface of the holder) when the upper surface of the holder is parallel to the bottom surface of the package.

However, according to research carried out by the present inventors, it has been found that sometimes the optical axis of the condensing lens may not become parallel to the bottom surface of the package even when the adhesion surface of the condensing lens fits the upper surface of the holder. This is because the orientation of the condensing lens can vary according to the direction and distribution of the pressing force and the like when the condensing lens is pressed against the upper surface of the holder. Although the inclination of the condensing lens fixed in the above manner is slight, the slight inclination of the condensing lens causes misalignment between the optical axis of the condensing lens and the core axis of the near-end portion of the optical fiber, so that the input efficiency of the laser beams which is condensed by the condensing lens and enters the optical fiber is reduced.

In the above first example in which the problem occurs, a holder is fixed on the bottom surface of the package, and the condensing lens (as an optical component) is adhesively fixed to the holder. On the other hand, in the second example of the laser apparatus, a holder to which an optical component is to be fixed is fixed as a submount to a mount which is fixed to a bottom surface of a package. In the second example, the holder can also be adhesively fixed with an inclination from the fixed mount for a reason similar to the first example. For example, in the case where the holder as the submount has a rectangular parallelepipedic shape, and a side surface of the holder is adhesively fixed to a vertical surface of the fixed mount, and an optical component such as a lens is fixed on the upper surface of the holder, it may be considered that the upper surface of the holder becomes level when the side surface of the holder is adhesively fixed to the vertical surface of the fixed mount in such a manner that the side surface (as an adhesion surface) of the holder fits the vertical surface (as a mounting surface) of the fixed mount. However, the side surface of the holder can be fixed to the mounting surface of the fixed mount with an inclination from the mounting surface of the fixed mount for a similar reason to the aforementioned first example.

In the above examples, the problems arise in the laser apparatuses in which a plurality of laser beams enter a single optical fiber and are optically combined. However, even in other laser apparatuses, similar problems can also occur, i.e., an adhesion surface of an optical component such as a lens or a holder for fixing an optical component can be fixed to a mounting surface of a member arranged on the main body side of each laser apparatus with an inclination from the mounting surface.

SUMMARY OF THE INVENTION

The present invention has been developed in view of the above circumstances.

The first object of the present invention is to provide a laser apparatus having a structure which enables adhesive fixing of an adhesion surface of an optical component (such as a lens) or a holder (for fixing an optical component) to a mounting surface of a member arranged on the main body side of the laser apparatus in such a manner that the adhesion surface is precisely parallel to the mounting surface.

The second object of the present invention is to provide a method for assembling the above laser apparatus.

(I) In order to accomplish the above first object, in the laser apparatus according to the present invention, a reference surface is formed on each of an attachment part and a fixing member which is arranged for fixing the attachment part, so that it is possible to confirm the angle between an adhesion surface of the attachment part and a mounting surface of the fixing member by measuring the angle which each reference surface makes with a predetermined reference direction.

Specifically, according to the first aspect of the present invention, there is provided a laser apparatus comprising: a main body; an attachment part on which an adhesion surface and a first reference surface are formed, where the adhesion surface is flat, the first reference surface is flat and makes a first predetermined angle with the adhesion surface, and the attachment part is either of a holder which fixes an optical component and an optical component into which a laser beam is inputted or from which a laser beam is outputted; and a fixing member on which a mounting surface and a second reference surface are formed, and which is directly or indirectly fixed to the main body and adhesively holds the attachment part at the mounting surface by adhering the adhesion surface to the mounting surface, where the second reference surface is flat and makes a second predetermined angle with the mounting surface.

In the above laser apparatus, the fixing member may be directly fixed to the main body (e.g., to a bottom surface of a package as mentioned before), or may be indirectly fixed to the main body through another member. For example, when the present invention is applied to the aforementioned structure in which a mount is fixed on a bottom surface of a package, and a holder (as a submount) for fixing an optical component is adhesively fixed to the mount, it is possible to consider that the fixed mount corresponds to the fixing member, and the holder corresponds to the attachment part. Alternatively, it is also possible to consider that the holder corresponds to the fixing member, and the optical component corresponds to the attachment part.

Preferably, the laser apparatus according to the first aspect of the present invention may also have one or any possible combination of the following additional features (i) to (iv).

(i) The first reference surface and the second reference surface have an arithmetic average roughness (Ra) smaller than 0.08 micrometers.

(ii) In the laser apparatus having the feature (i), a surface which is adhesively fixed to one of the first reference surface and the second reference surface has an arithmetic average roughness (Ra) equal to or greater than 0.15 micrometers and smaller than 0.35 micrometers.

(iii) The laser apparatus according to the first aspect of the present invention may further comprise a single optical fiber, one or more laser sources which emit a plurality of laser beams, an optical system which makes the plurality of laser beams enter the optical fiber through an end face of the optical fiber, and one of the first reference surface and the second reference surface is formed on one of optical components which constitute the optical system and holders which fix the optical components.

(iv) In the laser apparatus having the feature (iii), the plurality of laser beams are emitted from the one or more laser sources as divergent laser beams, the optical components include either of a condensing lens and a set of collimator lenses, the set of collimator lenses collimate the plurality of laser beams emitted from the one or more laser sources and the condensing lens condenses the plurality of laser beams collimated by the set of collimator lenses so that the plurality of laser beams converges on the end face of the optical fiber.

(II) In addition, in order to accomplish the aforementioned second object, the second aspect of the present invention is provided. According to the second aspect of the present invention, there is provided a method for assembling the laser apparatus according to the first aspect of the present invention. The above method comprises the steps of: (a) measuring a first angle which the second reference surface makes with a predetermined reference direction after the fixing member is fixed to the main body; (b) adjusting the orientation of the attachment part while measuring a second angle which the first reference surface makes with the predetermined reference direction; and (c) adhesively fixing the attachment part to the fixing member when the second angle is equal to an angle predetermined based on the first angle, the first predetermined angle, and the second predetermined angle.

Preferably, the method according to the second aspect of the present invention may also have one or any possible combination of the aforementioned additional features (i) to (iv) and the following additional features (v) and (vi).

(v) The first reference surface and the mounting surface are arranged in parallel, and the second reference surface and the adhesion surface are arranged in parallel, and in step (c), the attachment part is adhesively fixed to the fixing member when the second angle coincides with the first angle.

(vi) The first angle and the second angle are measured by using a laser autocollimator.

(III) The first and second aspects of the present invention have the following advantages.

(1) The method according to the second aspect of the present invention enables adhesive fixing of the attachment part to the fixing member in such a manner that the adhesion surface of the attachment part is precisely parallel to the mounting surfaces of the fixing member. For example, in the case where the first reference surface and the mounting surface of the fixing member are arranged in parallel, and the second reference surface and the adhesion surface of the attachment part are arranged in parallel, the adhesion surface of the attachment part is parallel to the mounting surface of the fixing member when the second angle (which the second reference surface of the attachment part makes with the predetermined reference direction) is equal to the first angle (which the first reference surface makes with the predetermined reference direction). Therefore, it is possible to fix the attachment part to the fixing member in such a manner that the adhesion surface of the attachment part is parallel to the mounting surface of the fixing member, for example, by adhering the adhesion surface of the attachment part to the mounting surface of the fixing member with spots of adhesive while the second angle is equal to the first angle.

In addition, when the above first and second angles are measured by using a laser autocollimator, the precision in the measurement becomes very high. Therefore, it is possible to make the adhesion surface of the attachment part and the mounting surface of the fixing member precisely parallel with each other.

(2) In the laser apparatus according to the first aspect of the present invention, the first reference surface being flat and making the first predetermined angle with the mounting surface of the fixing member is formed on the fixing member, and the second reference surface being flat and making the second predetermined angle with the adhesion surface of the attachment part is formed on the attachment part. Therefore, it is possible to check whether or not the adhesion surface and the mounting surface are parallel, by using the first reference surface of the fixing member and the second reference surface of the attachment part. In addition, it is possible to find a defective product in which the adhesion surface and the mounting surface are not parallel with desired precision by making a check for the parallelism as above after the laser apparatus is assembled. Further, in the case where the attachment part is removed from the laser apparatus according to the first aspect of the present invention after the laser apparatus is determined to be a defective, and then the laser apparatus is reassembled, it is possible to execute the method according to the second aspect of the present invention.

(3) In order to precisely measure the second angle (which the second reference surface of the attachment part makes with the predetermined reference direction) and the first angle (which the first reference surface of the fixing member makes with the predetermined reference direction), it is desirable to use an optical technique in which a laser beam is reflected by each of the first and second reference surfaces. For example, it is desirable to use the aforementioned laser autocollimator. In the case where the first reference surface and the second reference surface have an arithmetic average roughness (Ra) smaller than 0.08 micrometers, it is possible to suppress scattering of the laser beam by the first reference surface and the second reference surface, so that it is possible to realize highly satisfactory measurement of the first and second angles by using the above optical technique.

(4) Further, in the case where the surface which is adhesively fixed to the first reference surface of the fixing member or the second reference surface of the attachment part (each having an arithmetic average roughness (Ra) smaller than 0.08 micrometers) has an arithmetic average roughness (Ra) equal to or greater than 0.15 micrometers and smaller than 0.35 micrometers, i.e., in the case where the surface adhesively fixed to the first reference surface or the second reference surface is relatively rough, penetration of an adhesive into the gap between the above surface and the first reference surface or the second reference surface is facilitated, so that it is possible to realize satisfactorily effective adhesion.

(5) Furthermore, in the case where the laser apparatus according to the first aspect of the present invention comprises a single optical fiber, one or more laser sources which emit a plurality of laser beams, and an optical system which makes the plurality of laser beams enter the optical fiber through an end face of the optical fiber, it is possible to coaxially align the optical axis of the optical system and the core axis of the optical fiber with high precision, so that sufficiently high input efficiency of the laser beams into the optical fiber is ensured.

DESCRIPTION OF THE DRAWINGS

FIG. 7 is a fourth diagram for explaining the method for assembling the laser apparatus.

DESCRIPTION OF PREFERRED EMBODIMENTS

An embodiment of the present invention is explained in detail below with reference to drawings.

Construction

Figure 1:
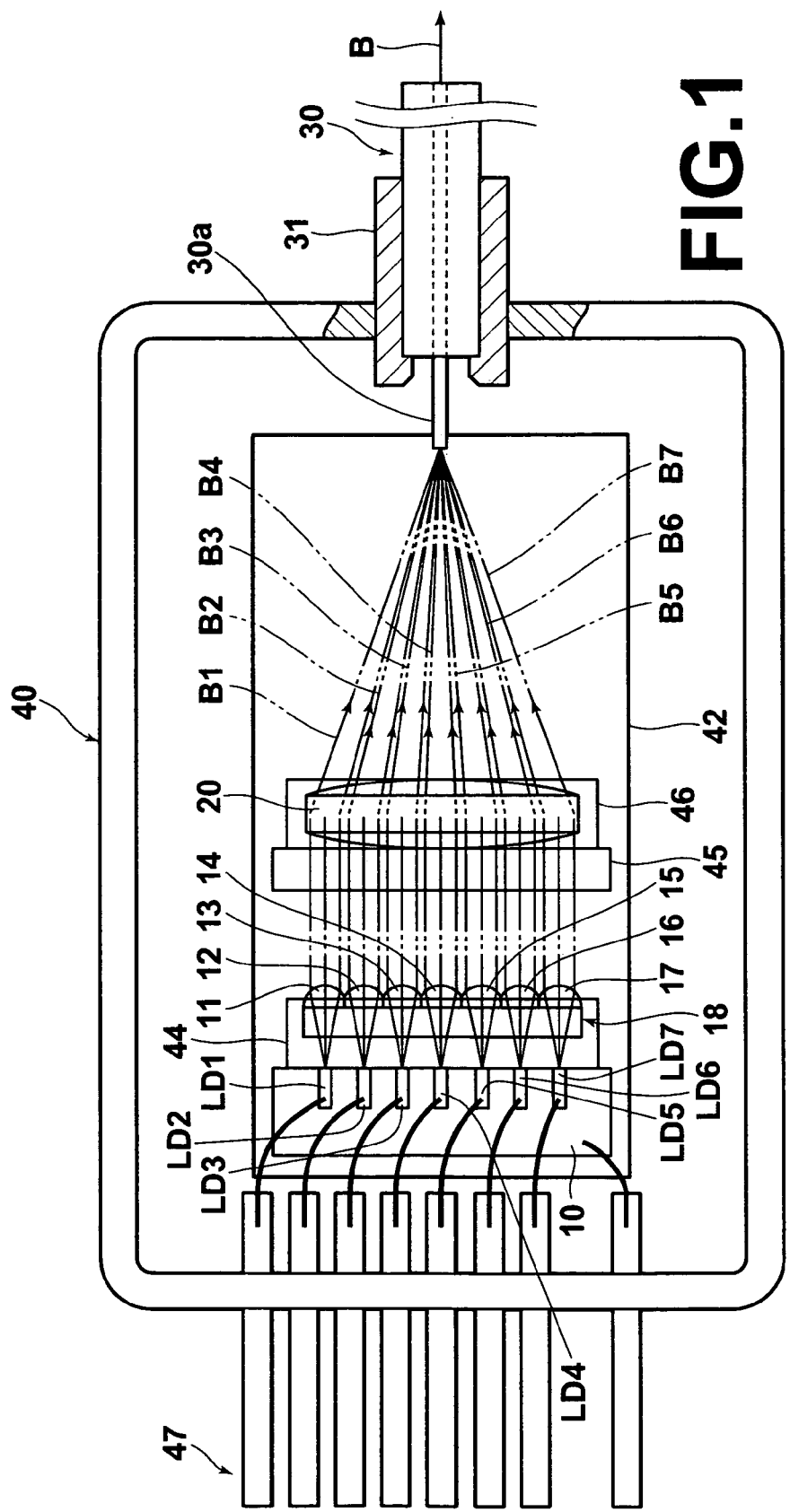
FIG. 1 is a plan view, partly in cross section, of a laser apparatus according to an embodiment of the present invention.
Figure 2:
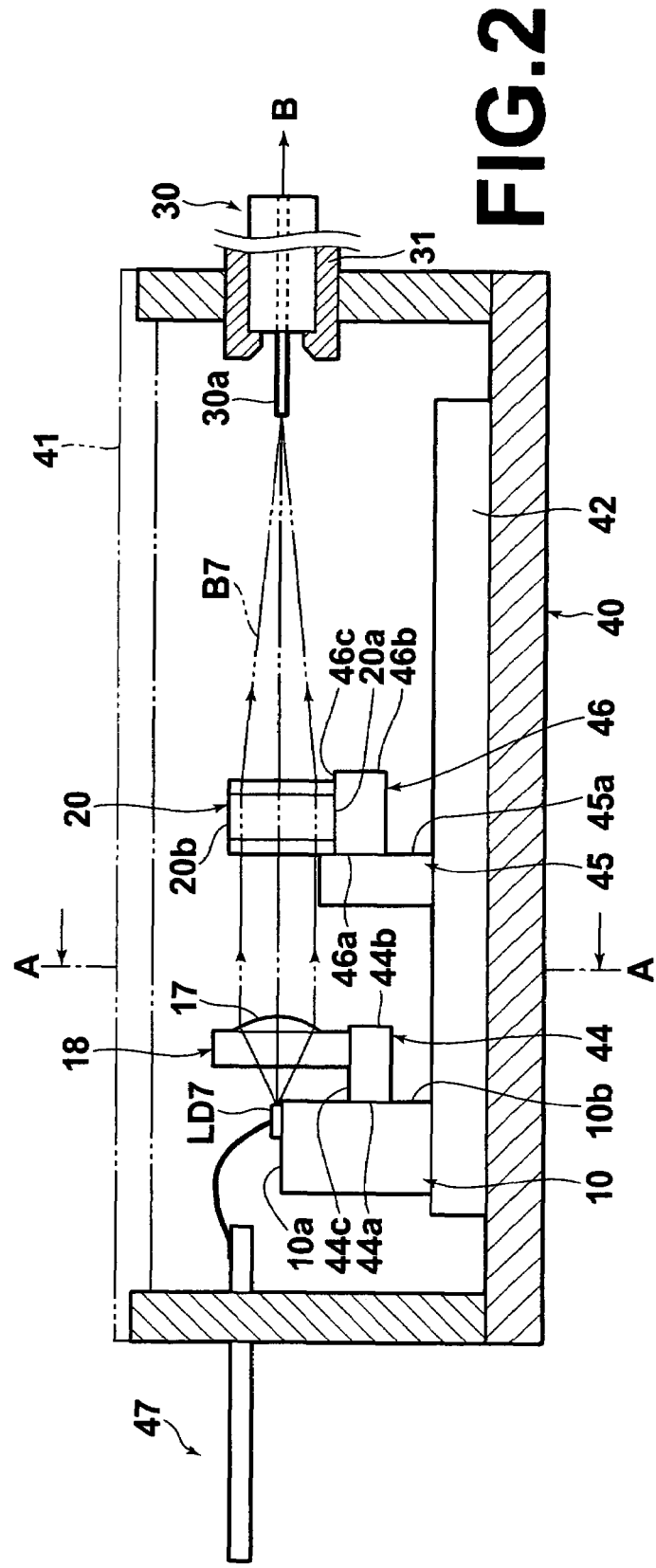
FIG. 2 is a side view, partly in cross section, of the laser apparatus according to the embodiment.
Figure 3:
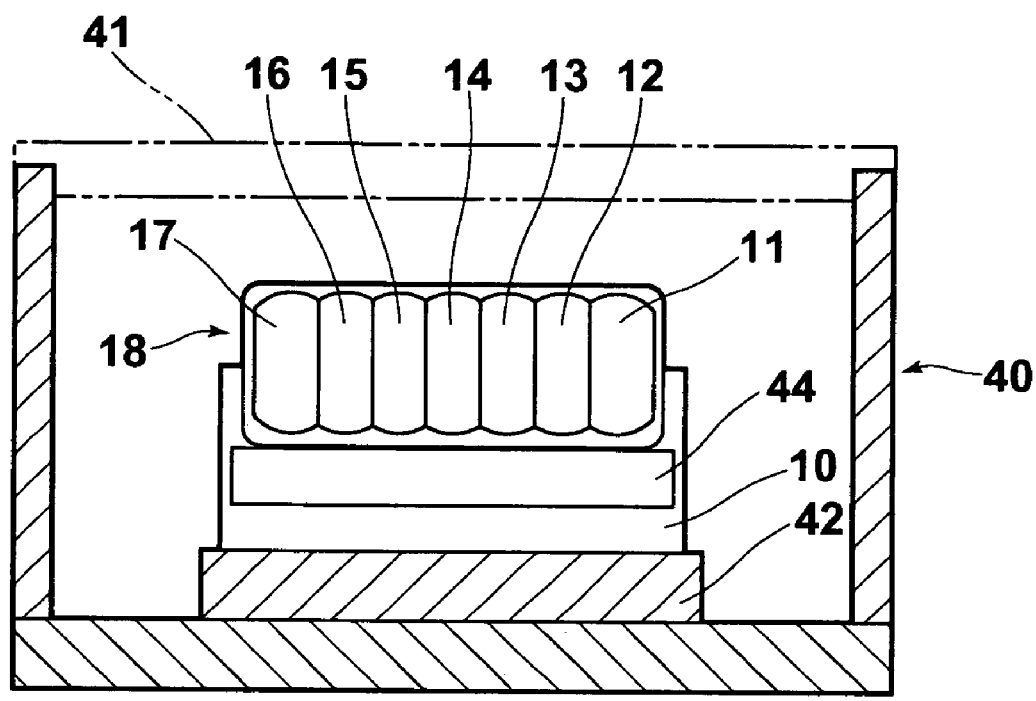
FIG. 3 is a front view of a rear half of the laser apparatus according to the embodiment which is cut at a cross section.

FIGS. 1 and 2 are respectively plan and side views, partly in cross section, of a laser apparatus according to an embodiment of the present invention, and FIG. 3 is a front view of a rear half of the laser apparatus which is cut at the cross section A-A indicated in FIG. 2. The laser apparatus according to the present embodiment is a high-luminosity combined-ultraviolet-light laser apparatus (which may be hereinafter referred to as a combined laser apparatus or a laser-light source).

As illustrated in FIGS. 1, 2, and 3, the laser apparatus according to the present embodiment comprises a plurality (e.g., seven) of GaN-based semiconductor laser chips LD1, LD2, LD3, LD4, LD5, LD6, and LD7, a collimator-lens array 18, a condensing lens 20, and a multimode optical fiber 30. The GaN-based semiconductor lasers LD1 through LD7 are arrayed on and fixed to a heat block 10, which has high thermal conductivity. In the collimator-lens array 18, a plurality of collimator lenses 11 through 17 respectively corresponding to the GaN-based semiconductor lasers LD1 through LD7 are integrally formed.

For example, all the GaN-based semiconductor lasers LD1 through LD7 have an oscillation wavelength of 405 nm and a maximum output power of 300 mW. The GaN-based semiconductor lasers LD1 through LD7 oscillate in multiple transverse modes. Alternatively, it is possible to use single-mode semiconductor lasers.

The laser beams B1 through B7 are emitted from the GaN-based semiconductor lasers LD1 through LD7 as divergent beams. Then, the divergent laser beams B1 through B7 are respectively collimated by the collimator lenses 11 through 17 in the collimator-lens array 18. FIG. 3 shows the collimator-lens array 18 viewed from the cross section A-A indicated in FIG. 2.

The collimated laser beams B1 through B7 are condensed by the condensing lens 20, and converge on an light-entrance end face of the core 30a of the multimode optical fiber 30. In this embodiment, the collimator lenses 11 through 17 and the condensing lens 20 constitute an optical condensing system, and the optical condensing system and the multimode optical fiber 30 constitute an optical combining system. That is, the laser beams B1 through B7 condensed by the condensing lens 20 enter the core 30a of the multimode optical fiber 30, propagate through the core 30a, and are optically combined into a single laser beam B, so that the laser beam B is outputted from the multimode optical fiber 30. The multimode optical fiber 30 maybe a step-index type, a graded-index type, or a composite-type optical fiber. In the composite-type optical fiber, the functions of the step-index type optical fiber and the graded-index type optical fiber are combined.

The optical components constituting the laser apparatus according to the present embodiment are contained in a box type package 40. The package 40 has an opening on its upper side, and is provided with a cover 41, so that the opening of the package 40 can be closed with the cover 41. Thus, when the opening of the package 40 is closed with the cover 41, the optical components are held in a closed and hermetically sealed space enclosed by the package 40 and the cover 41. A near-end portion of the multimode optical fiber 30 on the light-entrance side is held in a ferrule 31, and fixed to a sidewall of the package 40.

A base plate 42 is fixed on the bottom surface of the package 40, the aforementioned heat block 10 is attached on the upper surface of the base plate 42, the GaN-based semiconductor lasers LD1 through LD7 are fixed on an upper face 10a of the heat block 10, and a collimator-lens holder 44 for holding the collimator-lens array 18 is fixed on a front face 10b of the heat block 10. In addition, a mount 45 for fixing a lens is fixed on the upper surface of the base plate 42, and a condensing-lens holder 46 for holding the condensing lens 20 is fixed on a front face 45a of the mount 45. Further, wirings 47 for supplying driving currents to the GaN-based semiconductor lasers LD1 through LD7 are led out of the package 40 through an opening formed in a sidewall of the package 40.

As illustrated in FIG. 3, each of the collimator lenses 11 through 17 in the collimator-lens array 18 has a shape obtained by cutting out an elongated portion of an aspherical round lens so that the portion contains the optical axis of the aspherical round lens. For example, the collimator-lens array 18 can be formed by molding from optical glass. The collimator lenses 11 through 17 have a first aperture diameter in a first direction and a second aperture diameter in a second direction perpendicular to the first direction, and the second aperture diameter is greater than the first aperture diameter, where the light-emission points of the GaN-based semiconductor lasers LD1 through LD7 are arrayed along the first direction (i.e., the horizontal direction in FIG. 3), and the second direction corresponds to the vertical direction in FIG. 3. Thus, the collimator lenses 11 through 17 are closely arranged in the direction along which the light-emission points of the GaN-based semiconductor lasers LD1 through LD7 are arrayed.

Each of the GaN-based semiconductor lasers LD1 to LD7 has an emission width of about 2 micrometers. For example, the spread angle of each of laser beams B1 through B7 emitted from the GaN-based semiconductor lasers LD1 to LD7 is 10 degrees in the direction parallel to the active layer and 30 degrees in the direction perpendicular to the active layer. The light-emission points of the GaN-based semiconductor lasers LD1 to LD7 are arranged along a line parallel to the active layers of the GaN-based semiconductor lasers LD1 to LD7.

Therefore, the laser beams B1 through B7 emitted from the GaN-based semiconductor lasers LD1 to LD7 enter the collimator lenses 11 through 17 in such a manner that the direction of the greater spread angle of each of the laser beam B1 through B7 coincides with the direction of the greater aperture diameter of each of the collimator lenses 11 through 17, and the direction of the smaller spread angle of each of the laser beam B1 through B7 coincides with the direction of the smaller aperture diameter of each of the collimator lenses 11 through 17. That is, the elongated shapes of the collimator lenses 11 through 17 correspond to the elliptical cross-sectional shapes of the laser beams B1 through B7 which enter the collimator lenses 11 through 17, so that the noneffective portions of the collimator lenses 11 through 17 are minimized. In this example, the effective aperture diameter of each of the collimator lenses 11 through 17 is 1.1 mm in the horizontal direction, and 3.6 mm in the vertical directions, and the beam diameter of each of the laser beam B1 through B7 is 0.9 mm in the horizontal direction and 2.6 mm in the vertical direction. In addition, each of the collimator lenses 11 through 17 has a focal length (f1) of 3 mm and a numerical aperture (NA) of 0.6, and the collimator lenses 11 through 17 are arranged with a pitch of 1.2 mm.

The condensing lens 20 has a shape which is obtained by cutting an aspherical round lens so as to leave an elongated portion containing the optical axis of the aspherical round lens. Thus, the condensing lens 20 is elongated in the horizontal direction (along which the collimator lenses 11 through 17 are arranged, and has a small dimension in the vertical direction (perpendicular to the direction along which the collimator lenses 11 through 17 are arranged). The condensing lens 20 has a focal length (f2) of 23.15 mm and a magnification power of 7.7. The condensing lens 20 and the aforementioned collimator-lens array 18 can be formed by molding from optical glass or synthetic resin.

For example, the multimode optical fiber 30 is a step-index type optical fiber having a core diameter of 60 micrometers and a numerical aperture (NA) of 0.23. In addition, the transmittance of the end face coating is 99.5%, and the internal loss is 98.5%.

In this example, the coupling efficiency of the collimated laser beams B1 through B7 to the multimode optical fiber 30 is 0.9. Therefore, when the GaN-based semiconductor lasers LD1 through LD7 each have an output power of 300 mW, the optically-combined laser beam B has an output power of 1.89 W (=300 mW×0.9×7).

In the above laser apparatus, in order to ensure high coupling efficiency of the collimated laser beams B1 through B7 to the multimode optical fiber 30, it is necessary to fix the collimator-lens array 18 and the condensing lens 20 in such a manner that the optical axes of the collimator-lens array 18 and the condensing lens 20 are precisely parallel to the core axis of the multimode optical fiber 30 at the light-entrance end of the multimode optical fiber 30.

Assembly

Hereinbelow, a method for assembling a structure for fixing the collimator-lens array 18 and the condensing lens 20 in the above-mentioned manner is explained in detail.

First, a structure for fixing the collimator-lens array 18, the collimator-lens holder 44, and the like is explained below.

In this embodiment, the heat block 10 is made of AlN (aluminum nitride) and has a rectangular parallelepipedic shape, where AlN is superior in thermal conductivity and polishing workability. The bottom face of the heat block 10 is metalized by evaporation of gold, and fixed on the upper surface of the base plate 42 with low-melting-point solder or the like, where the base plate 42 is plated with gold. The base plate 42 is formed of, for example, CuW, CuMo, or Kovar, and fixed to the bottom surface of the package 40.

The heat block 10 is fixed in such a manner that the front face 10b of the heat block 10 is precisely perpendicular to the base plate 42. The front face 10b is mirror finished, and used as amounting surface (on which the collimator-lens holder 44 is to be fixed) and as a reference surface (explained later).

The GaN-based semiconductor lasers LD1 through LD7 are mounted on the upper face 10a of the heat block 10 by using an AuSn alloy having a melting point of 280° C. (as a first brazing material). In the operation of mounting the GaN-based semiconductor lasers LD1 through LD7, the GaN-based semiconductor lasers LD1 through LD7 are first tacked to the upper face 10a of the heat block 10 one by one with a second brazing material, where the melting point of the second brazing material is adjusted at a first temperature which is lower than the melting point of the first brazing material of the AuSn alloy. After all the GaN-based semiconductor lasers LD1 through LD7 are tacked to the heat block 10, the assembly is heated to a second temperature which is higher than the melting point of the first brazing material (the AuSn alloy) in a reflow furnace so that the first brazing material is melted. Thus, the GaN-based semiconductor lasers LD1 through LD7 are fixed. For example, the first and second temperatures are set to 150° C. and 330° C., respectively.

When the GaN-based semiconductor lasers LD1 through LD7 are fixed as above, the temperature of the first brazing material deposited on the areas on which semiconductor lasers are not yet mounted does not exceed its melting point. Therefore, it is possible to prevent oxidation of the first brazing material, and realize stable mounting with high precision (e.g., approximately ±0.1 micrometers).

The near-end portion of the multimode optical fiber 30 on the light-entrance side is fixed to the package 40 by hermetically fixing the ferrule 31 which holds the near-end portion of the multimode optical fiber 30, to a sidewall of the package 40. At this time, the multimode optical fiber 30 is fixed in such a manner that the core axis of the near-end portion of the multimode optical fiber 30 is precisely perpendicular to the front face 10b of the heat block 10.

Figure 4:
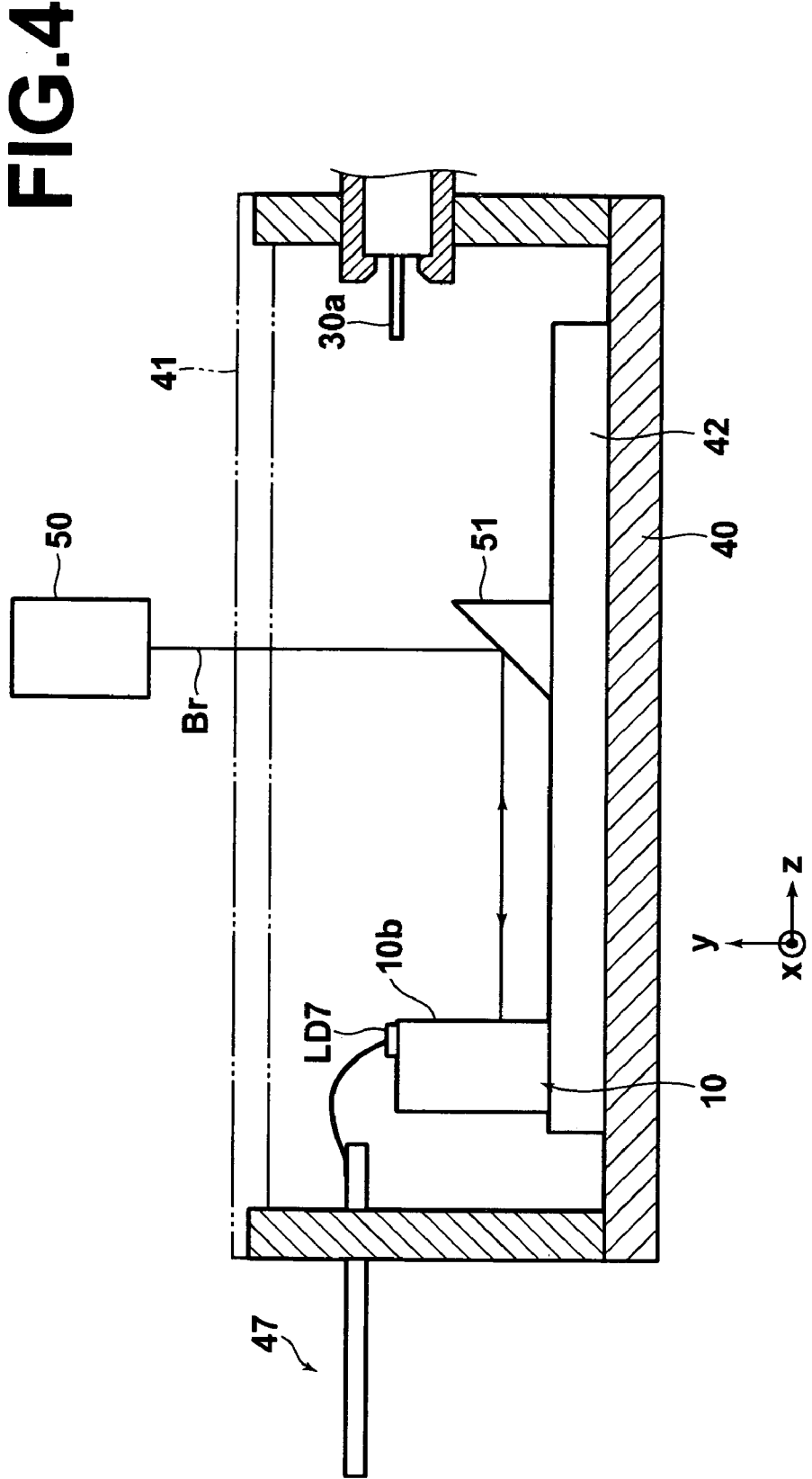
FIG. 4 is a first diagram for explaining a method for assembling the laser apparatus.

Next, before adhesively fixing the collimator-lens holder 44, the angle between the front face 10b (as the mounting surface and the reference surface of the heat block 10) and a reference direction is measured by using the laser autocollimator 50 and the mirror 51 as illustrated in FIG. 4, where the mirror 51 is placed on the base plate 42. According to the present embodiment, the propagation direction of a laser beam Br emitted from the laser autocollimator 50 is changed by 90 degrees by reflection by the mirror 51 so that the laser beam Br is perpendicularly incident on the front face 10b of the heat block 10. In this example, the propagation direction z of the laser beam Br after the reflection by the mirror 51 is the reference direction.

The laser autocollimator 50 receives the laser beam Br which is reflected at the front face 10b and is again reflected by the mirror 51 toward the laser autocollimator 50, and measures the angle which the front face 10b makes with the reference direction. This angle is determined by inclination angles $\theta x$ and $\theta y$ around the x- and y-axes, which are perpendicular to the reference direction z and to each other. In the example of FIG. 4, the y direction is identical to the propagation direction of the laser beam Br emitted from the laser autocollimator 50. For example, when the front face 10b of the heat block 10 is precisely perpendicular to the reference direction z, both the inclination angles $\theta x$ and $\theta y$ are zero. The measured inclination angles $\theta x$ and $\theta y$ are recorded on a recording sheet or the like, or stored in a storage.

Figure 5:
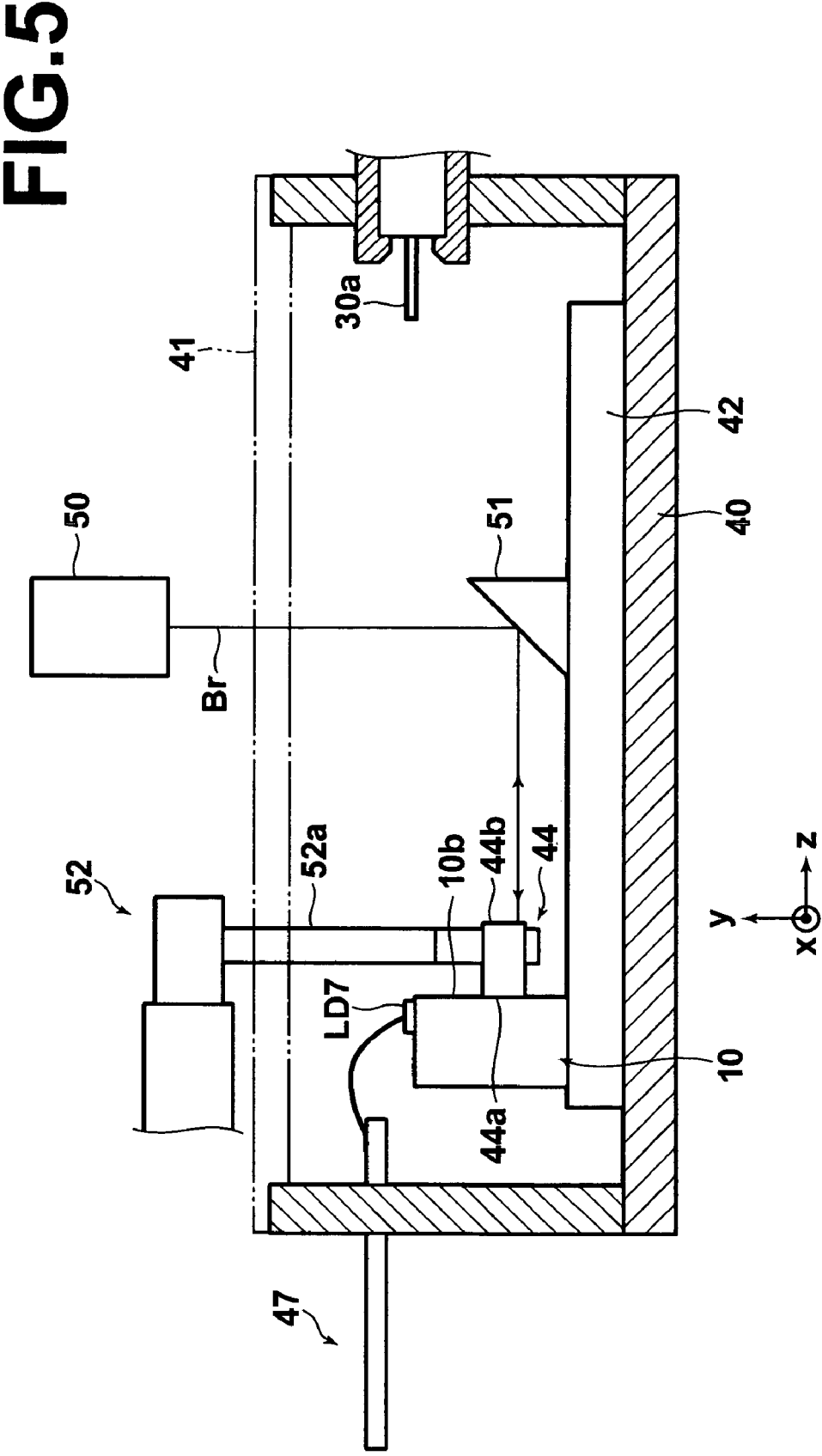
FIG. 5 is a second diagram for explaining the method for assembling the laser apparatus.

Next, the collimator-lens holder 44 is held by using a mechanical hand 52 (having a holding portion 52a which holds the collimator-lens holder 44) in a position in which a rear face 44a (as an adhesion surface) of the collimator-lens holder 44 lightly touches the front face 10b of the heat block 10 as illustrated in FIG. 5. For example, the mechanical hand 52 is a six-axis type, which has six-axis freedom in parallel translation in the directions of three axes and rotations on the three axes. It is possible to maintain the force which makes the collimator-lens holder 44 touch the front face 10b, at a predetermined level, for example, by using a load cell or the like, which is built in the mechanical hand 52.

In addition, while the collimator-lens holder 44 is held as above, the angle which a front face 44b (as a reference surface) of the collimator-lens holder 44 makes with the reference direction z is continuously measured in a similar manner to the aforementioned measurement of the angle between the front face 10b and the reference direction z. The angle between the front face 44b and the reference direction z is also determined by the inclination angles $\theta x$ and $\theta y$.

In the operation of holding the collimator-lens holder 44, the mechanical hand 52 is controlled so that the continuously measured inclination angles $\theta x$ and $\theta y$ of the front face 44b respectively coincide with the inclination angles $\theta x$ and $\theta y$ of the front face 10b, and the collimator-lens holder 44 is located at a predetermined position in each of the x- and y-directions. When the collimator-lens holder 44 reaches the desired position, the movement of the mechanical hand 52 is stopped, and spots of adhesive are deposited in the gap between the front face 10b of the heat block 10 and the rear face 44a of the collimator-lens holder 44. Thus, when the spots of adhesive are cured, the collimator-lens holder 44 is adhesively fixed to the front face 10b.

In order to place the collimator-lens holder 44 at the predetermined position in each of the x- and y-directions, it is possible to determine the position of the collimator-lens holder 44 in each of the x- and y-directions by making the rear face 44a of the collimator-lens holder 44 slide on the front face 10b of the heat block 10. Therefore, the operation of placing the collimator-lens holder 44 at the predetermined position in each of the x- and y-directions is not difficult.

The collimator-lens holder 44 is formed so that the rear face 44a and the front face 44b are parallel with the high precision of approximately ±15". Such high precision in the parallelism between the rear face 44a and the front face 44b can be readily realized by polishing these faces. In this case, when the inclination angles $\theta x$ and $\theta y$ of the front face 44b of the collimator-lens holder 44 respectively coincide with the inclination angles $\theta x$ and $\theta y$ of the front face 10b of the heat block 10, the rear face 44a of the collimator-lens holder 44 is parallel with the front face 10b. Therefore, when the collimator-lens holder 44 is adhesively fixed to the front face 10b while maintaining the position in which the inclination angles $\theta x$ and $\theta y$ of the front face 44b of the collimator-lens holder 44 respectively coincide with the inclination angles $\theta x$ and $\theta y$ of the front face 10b of the heat block 10, the rear face 44a of the fixed collimator-lens holder 44 becomes precisely parallel with the front face 10b of the heat block 10.

In addition, in the above operation for adhesively fixing the collimator-lens holder 44, the mechanical hand 52 is further controlled on the basis of the outer dimensions of the collimator-lens holder 44 so that the collimator-lens holder 44 reaches a predetermined angular position around the z-axis in which an upper face 44c of the collimator-lens holder 44 becomes parallel with the base plate 42. Thus, the upper face 44c of the fixed collimator-lens holder 44 becomes precisely parallel with the base plate 42. The outer dimensions of the collimator-lens holder 44 are precisely measured in advance.

The adhesive used in the above adhesively fixing is, for example, an ultraviolet-curable type. However, since the collimator-lens holder 44 is formed of glass which transmits ultraviolet light, the ultraviolet light for curing the adhesive can transmit through the collimator-lens holder 44, so that the adhesive can be sufficiently irradiated with the ultraviolet light.

Figure 6:
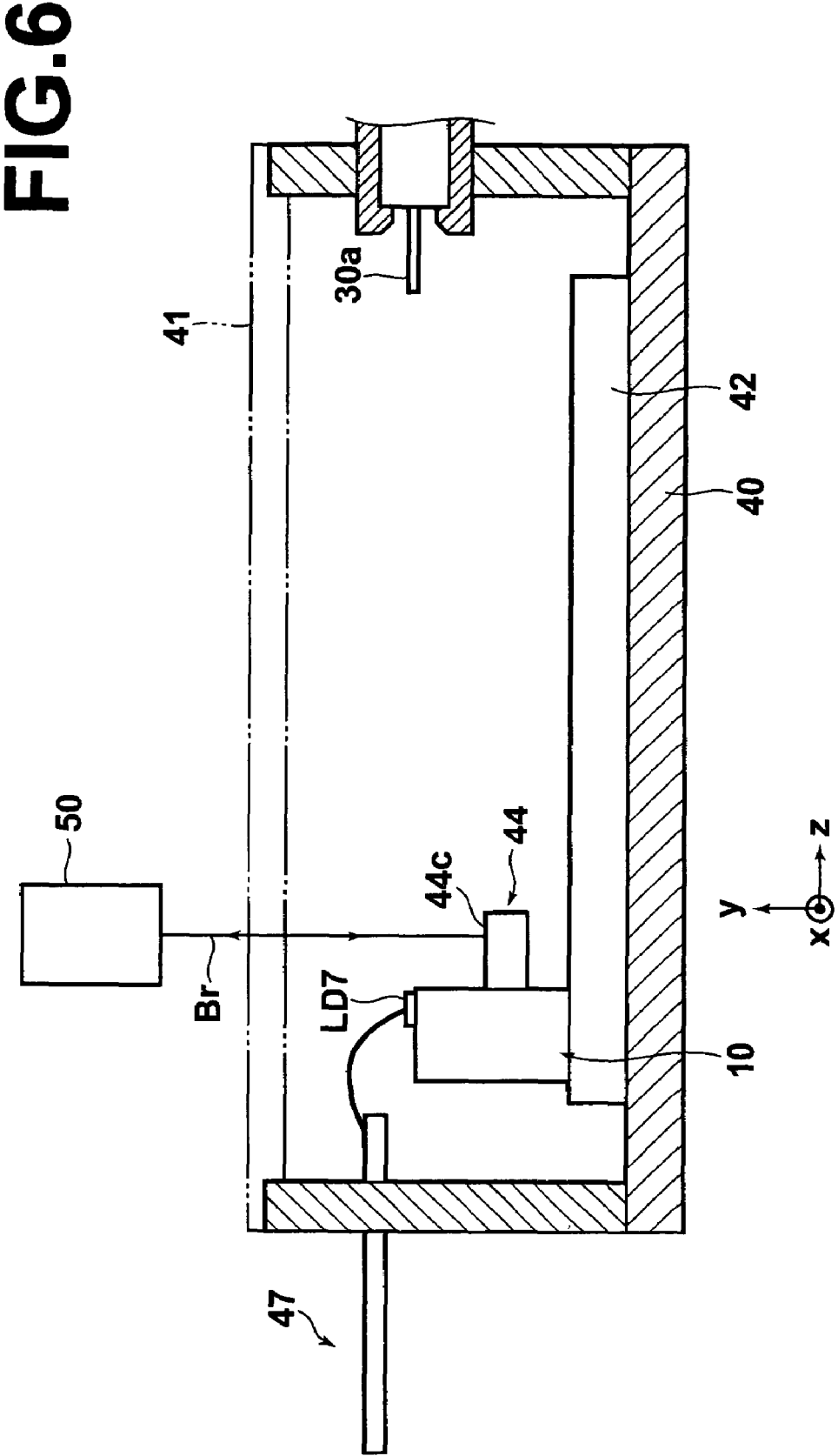
FIG. 6 is a third diagram for explaining the method for assembling the laser apparatus.

Thereafter, the mechanical hand 52 is controlled so that the holding portion 52a is removed from the package 40. Then, the angle which an upper face 44c of the fixed collimator-lens holder 44 makes with a reference direction y is measured by using the laser autocollimator 50 as illustrated in FIG. 6. In this measurement, the reference direction y is the propagation direction of the laser beam Br emitted downward from the laser autocollimator 50 as illustrated in FIG. 6, which is identical to the propagation direction of the laser beam Br emitted downward from the laser autocollimator 50 in the operations illustrated in FIGS. 4 and 5. At this time, the angle which the upper face 44c of the collimator-lens holder 44 makes with the reference direction y is determined by the inclination angles φx and φz around the x-and z-axes. For example, when the upper face 44c of the collimator-lens holder 44 is precisely perpendicular to the reference direction y, the inclination angles φx and φz are zero. The measured inclination angles φx and φz are recorded on a recording sheet or the like, or stored in a storage.

Next, the collimator-lens array 18 is held by using the mechanical hand 52 in a position in which a lower face 18a (as an adhesion surface) of the collimator-lens array 18 lightly touches the upper face 44c of the collimator-lens holder 44 as illustrated in FIG. 7. While the collimator-lens array 18 is held as above, the angle which an upper face 18b (as a reference surface) of the collimator-lens array 18 makes with the reference direction y is continuously measured in a similar manner to the aforementioned measurement of the angle between the upper face 44c and the reference direction y, and the angle between the upper face 18b and the reference direction y is also determined by the inclination angles φx and φz.

In the operation of holding the collimator-lens array 18, the mechanical hand 52 is controlled so that the continuously measured inclination angles φx and 100 z of the upper face 18b respectively coincide with the inclination angles φx and φz of the upper face 44c, and the collimator-lens array 18 is located at a predetermined position in each of the x- and z-directions. When the collimator-lens array 18 reaches the desired position, the movement of the mechanical hand 52 is stopped, and spots of adhesive are deposited in the gap between the upper face 44c of the collimator-lens holder 44 and the lower face 18a of the collimator-lens array 18. Thus, when the spots of adhesive are cured, the collimator-lens array 18 is adhesively fixed to the upper face 44c.

In order to place the collimator-lens array 18 at the predetermined position in each of the x- and z-directions, it is possible to determine the position of the collimator-lens array 18 in each of the x- and z-directions by making the lower face 18a of the collimator-lens array 18 slide on the upper face 44c of the collimator-lens holder 44. Therefore, the operation of placing the collimator-lens array 18 at the predetermined position in each of the x- and z-directions is not difficult.

The collimator-lens array 18 is formed so that the lower face 18a and the upper face 18b are precisely parallel. In this case, when the inclination angles φx and φz of the upper face 18b of the collimator-lens array 18 respectively coincide with the inclination angles φx and φz of the upper face 44c of the collimator-lens holder 44, the lower face 18a of the collimator-lens array 18 is parallel with the upper face 44c.

Therefore, when the collimator-lens array 18 is adhesively fixed to the upper face 44c while maintaining the position in which the inclination angles φx and φz of the upper face 18b of the collimator-lens array 18 respectively coincide with the inclination angles φx and φz of the upper face 44c of the collimator-lens holder 44, the lower face 18a of the fixed collimator-lens array 18 becomes precisely parallel with the upper face 44c of the collimator-lens holder 44.

In addition, in the above operation for adhesively fixing the collimator-lens array 18, the mechanical hand 52 is further controlled, for example, on the basis of the outer dimensions of the collimator-lens array 18 so that the collimator-lens array 18 reaches a predetermined angular position around the y-axis in which the optical axes of the collimator lenses 11 through 17 become parallel to the core axis of the near-end portion of the multimode optical fiber 30. Thus, the optical axes of the collimator lenses 11 through 17 in the fixed collimator-lens array 18 become parallel to the core axis of the near-end portion of the multimode optical fiber 30.

However, it is impossible to achieve precise alignment between faces of members by only setting the angular position of the collimator-lens array 18 around the y-axis or the angular position of the collimator-lens holder 44 around the z-axis by use of the mechanical hand 52 as explained above. Therefore, according to the present invention, the reference surfaces are used in alignment between the faces of members.

When the collimator-lens array 18 is formed by high-precision molding, it is possible to achieve the high precision of approximately ±15″ in the parallelism between the lower face 18a and the upper face 18b. Therefore, when the upper face 18b is used as a reference surface in the angle measurement, it is possible to achieve the high precision of approximately ±30″ in the parallelism between the lower face 18a of the collimator-lens array 18 and the upper face 44c of the collimator-lens holder 44. In addition, it is also possible to make the lower face 18a and the upper face 18b parallel to the direction along which the collimator lenses 11 through 17 are arrayed, with the high precision of approximately ±15″.

For example, the adhesive used in the adhesive fixing of the collimator-lens array 18 is also an ultraviolet-curable type. However, since the collimator-lens array 18 (as well as the collimator-lens holder 44) is formed of glass which transmits ultraviolet light, the ultraviolet light for curing the adhesive can transmit through the collimator-lens array 18 and the collimator-lens holder 44, so that the adhesive can be sufficiently irradiated with the ultraviolet light.

When the collimator-lens holder 44 and the collimator-lens array 18 are adhesively fixed to the heat block 10 and the collimator-lens holder 44, respectively, as explained above, the optical axes of the collimator lenses 11 through 17 become parallel to the core axis of the near-end portion of the multimode optical fiber 30 with high precision in the fixed structure.

In the adhesive fixing of the collimator-lens holder 44 to the heat block 10 in the laser apparatus explained above, the heat block 10 corresponds to the aforementioned fixing member in the first and second aspects of the present invention, and the collimator-lens holder 44 corresponds to the aforementioned attachment part in the first and second aspects of the present invention. On the other hand, in the adhesive fixing of the collimator-lens array 18 to the collimator-lens holder 44, the collimator-lens holder 44 corresponds to the fixing member, and the collimator-lens array 18 corresponds to the attachment part.

Referring back to FIG. 2, a structure for fixing the condensing lens 20, the condensing-lens holder 46, and the like is explained below.

In this embodiment, the mount 45 (for holding the condensing-lens holder 46) is made of AlN (aluminum nitride) and has a rectangular parallelepipedic shape as the heat block 10. The lower face of the mount 45 is metalized by evaporation of gold, and fixed on the upper surface of the base plate 42 with low-melting-point solder or the like. As mentioned before, the base plate 42 is plated with gold. At this time, the mount 45 is fixed in such a manner that the front face 45a of the mount 45 is parallel to the front face 10b of the heat block 10. In order to realize this arrangement, it is possible to use the aforementioned method which is used for fixing the collimator-lens holder 44 to the front face 10b as illustrated in FIG. 5, and in which the laser autocollimator 50 and the mechanical hand 52 are used.

After the mount 45 is fixed as above, the condensing-lens holder 46 is adhesively fixed to the mount 45, and then the condensing lens 20 is adhesively fixed on an upper face 46c of the condensing-lens holder 46. The condensing-lens holder 46 is formed of, for example, ultraviolet-light-transparent glass, and has a rectangular parallelepipedic shape. In order to adhesively fix the condensing-lens holder 46 to the front face 45a of the mount 45, it is possible to similarly use the aforementioned method which is used for adhesively fixing the collimator-lens holder 44 to the front face 10b of the heat block 10. In the operation for adhesively fixing the condensing-lens holder 46 to the mount 45, a front face 46b of the condensing-lens holder 46 is used as a reference surface, and a rear face 46a of the condensing-lens holder 46 becomes an adhesion surface. Thus, the condensing-lens holder 46 is adhesively fixed to the front face 45a in such a manner that the rear face 46a is precisely parallel to the front face 45a of the mount 45.

It is possible to form the condensing-lens holder 46 in such a manner that the rear face 46a and the front face 46b are parallel with the precision of approximately ±15". Such high precision can be realized by polishing the rear face 46a and the front face 46b.

Next, the condensing lens 20 is adhesively fixed on an upper face 46c of the condensing-lens holder 46, which is adhesively fixed to the mount 45 as above. As mentioned before, the condensing lens 20 has a shape elongated in the horizontal direction. In addition, the condensing lens 20 is formed in such a manner that a lower face 20a (to be used as an adhesion surface) and an upper face 20b (to be used as a reference surface) are precisely parallel. In order to adhesively fix the condensing lens 20 on the upper face 46c of the condensing-lens holder 46, it is possible to similarly use the aforementioned method which is used for adhesively fixing the collimator-lens array 18 on the upper face 44c of the collimator-lens holder 44. That is, the upper face 20b of the condensing lens 20 is used as the reference surface, and the lower face 20a (as the adhesion surface) of the condensing lens 20 is adhesively fixed to the upper face 46c of the condensing-lens holder 46 so that the lower face 20a of the condensing lens 20 becomes precisely parallel to the upper face 46c of the condensing-lens holder 46.

It is also possible to form the condensing lens 20 in such a manner that the lower face 20a and the upper face 20b are parallel with the precision of approximately ±15". Such high precision can be realized by polishing the lower face 20a and the upper face 20b. In addition, it is also possible to make the lower face 20a and the optical axis of the condensing lens 20 parallel with the precision of approximately ±15".

In the adhesive fixing of the condensing-lens holder 46 to the mount 45 in the laser apparatus explained above, the mount 45 corresponds to the aforementioned fixing member in the first and second aspects of the present invention, and the condensing-lens holder 46 corresponds to the aforementioned attachment part in the first and second aspects of the present invention. On the other hand, in the adhesive fixing of the condensing lens 20 to the condensing-lens holder 46, the condensing-lens holder 46 corresponds to the fixing member, and the condensing lens 20 corresponds to the attachment part.

As explained above, the condensing lens 20 is fixed to the condensing-lens holder 46 so that the optical axis of the condensing lens 20 precisely coincides with the optical axis of the near-end portion of the multimode optical fiber 30. In addition, the collimator-lens array 18 is fixed so that the optical axes of the collimator lenses 11 through 17 are precisely parallel to the optical axis of the near-end portion of the multimode optical fiber 30. Therefore, high coupling efficiency of the laser beams B1 through B7 to the multimode optical fiber 30 is ensured.

In the above explanations, the inclinations of the collimator-lens array 18 and the condensing lens 20 are measured during assembly by using the reference surfaces as explained above. Further, even after completion of the assembly, the inclinations of the collimator-lens array 18 and the condensing lens 20 can be measured by using the reference surfaces in order to determine whether the assembled laser apparatus is nondefective or defective. Furthermore, the inclinations of the collimator-lens array 18 and the condensing lens 20 can be measured by using the reference surfaces during reassembly which is performed after the assembled laser apparatus is disassembled.

Moreover, in order to realize satisfactory reflection of the laser beam Br and suppress scattering during the measurement with respect to the reference direction, it is desirable that the reference surfaces used in the measurement be mirror finished with an arithmetic average roughness (Ra) smaller than 0.08 micrometers. In the present embodiment, such reference surfaces include the front face 10b of the heat block 10, the front face 44b and the upper face 44c of the collimator-lens holder 44, the upper face 18b of the collimator-lens array 18, the front face 45a of the mount 45, the front face 46b and the upper face 46c of the condensing-lens holder 46, and the upper face 20b of the condensing lens 20. When the reference surfaces are finished as above, it is possible to measure the angles with respect to the reference direction with the precision of approximately ±5".

On the other hand, in order to realize satisfactory penetration of the adhesive into the gaps between the adhesion surfaces and the reference surfaces, it is desirable that the adhesion surfaces to be adhered to the reference surfaces be rougher than the reference surfaces. In the present embodiment, such adhesion surfaces include the rear face 44a of the collimator-lens holder 44, the lower face 18a of the collimator-lens array 18, the rear face 46a of the condensing-lens holder 46, and the lower face 20a of the condensing lens 20. For example, when the reference surfaces are mirror finished with an arithmetic average roughness (Ra) smaller than 0.08 micrometers, it is desirable that the adhesion surfaces to be adhered to such reference surfaces have an arithmetic average roughness (Ra) from 0.15 to 0.35 micrometers. The arithmetic average roughness (Ra) can be measured, for example, by using a stylus-type roughness measurement device.

Other Matters (1) Although the one or more reference surfaces in each fixing member are set parallel to the mounting surfaces in the fixing member in the above embodiment, alternatively, it is possible to set each reference surface in each fixing member so as to form a predetermined angle (e.g., 90 degrees) with a mounting surface in the fixing member corresponding to the reference surface. Similarly, it is possible to set each reference surface in each attachment part so as to form a predetermined angle (e.g., 90 degrees) with an adhesion surface in the attachment part corresponding to the reference surface.

(2) Temperature variations occurring during use or storage of the laser apparatus can produce thermal stress in a portion of the collimator-lens holder 44 at which the collimator-lens holder 44 is adhered to the heat block 10. In order to reduce such thermal stress, it is desirable that the collimator-lens holder 44 be formed of glass having a linear expansion coefficient close to the linear expansion coefficient of AlN, of which the heat block 10 is formed. Similarly, it is desirable that the collimator-lens array 18 be formed of glass having a linear expansion coefficient close to the linear expansion coefficient of the glass of which the collimator-lens holder 44 is formed. For the same reason, it is desirable that the condensing-lens holder 46 be formed of glass having a linear expansion coefficient close to the linear expansion coefficient of AlN, of which the mount 45 is formed, and the condensing lens 20 be formed of glass having a linear expansion coefficient close to the linear expansion coefficient of the glass of which the condensing-lens holder 46 is formed.

(3) Although the heat block 10 and the mount 45 are formed of AlN in the above embodiment, it is also preferable to form the heat block 10 and the mount 45 of copper or a copper alloy. Further, it is possible to integrally form the heat block 10 and the mount 45.

(4) A combined laser apparatus comprising a single lens which has the functions of both of the collimator-lens array and the condensing lens is disclosed, for example, in U.S. Pat. No. 6,995,912 referred to before. Although the collimator-lens array 18 and the condensing lens 20 are separately formed in the above embodiment, the present invention can also be applied to the combined laser apparatus in which the functions of both of the collimator-lens array and the condensing lens are realized by a single lens.

(5) Although the present invention is applied to a combined laser apparatus in the embodiment, the present invention can be applied to all laser apparatuses which comprise an attachment part on which a flat adhesion surface is formed, and a fixing member which is fixed to a main body and holds the attachment part, where the attachment part is either an optical component or a holder which fixes an optical component (6) This application is based upon and claims the benefits of priority from the Japanese patent application No. 2005-082178, the entire contents of which are incorporated herein by reference.

What is claimed is:

1. A laser apparatus comprising:
a main body;
an attachment part on which an adhesion surface and a first reference surface are formed, where the adhesion surface is flat, the first reference surface is flat and makes a first predetermined angle with the adhesion surface, and the attachment part is either of a holder which fixes an optical component and an optical component into which a laser beam is inputted or from which a laser beam is outputted; and
a fixing member on which a mounting surface and a second reference surface are formed, and which is directly or indirectly fixed to said main body and adhesively holds said attachment part at the mounting surface by adhering said adhesion surface to the mounting surface, where the second reference surface is flat and makes a second predetermined angle with the mounting surface;
wherein the adhesion surface is precisely parallel to the mounting surface.

2. A laser apparatus comprising:
a main body;
an attachment part on which an adhesion surface and a first reference surface are formed, where the adhesion surface is flat, the first reference surface is flat and makes a first predetermined angle with the adhesion surface, and the attachment part is either of a holder which fixes an optical component and an optical component into which a laser beam is inputted or from which a laser beam is outputted; and
a fixing member on which a mounting surface and a second reference surface are formed, and which is directly or indirectly fixed to said main body and adhesively holds said attachment part at the mounting surface by adhering said adhesion surface to the mounting surface, where the second reference surface is flat and makes a second predetermined angle with the mounting surface;
wherein said first reference surface and said second reference surface have an arithmetic average roughness (Ra) smaller than 0.08 micrometers.

3. A laser apparatus according to claim 2, wherein a surface which is adhesively fixed to one of said first reference surface and said second reference surface has an arithmetic average roughness (Ra) equal to or greater than 0.15 micrometers and smaller than 0.35 micrometers.

4. A laser apparatus according to claim 1, further comprising a single optical fiber, one or more laser sources which emit a plurality of laser beams, an optical system which makes the plurality of laser beams enter the optical fiber through an end face of the optical fiber, and one of said first reference surface and said second reference surface is formed on one of optical components which constitute the optical system and holders which fix the optical components.

5. A laser apparatus according to claim 4, wherein said plurality of laser beams are emitted from said one or more laser sources as divergent laser beams, said optical components include either of a condensing lens and a set of collimator lenses, the set of collimator lenses collimate the plurality of laser beams emitted from said one or more laser sources, and the condensing lens condenses the plurality of laser beams collimated by the set of collimator lenses so that the plurality of laser beams converges on said end face of the optical fiber.

6. A laser apparatus according to claim 2, further comprising a single optical fiber, one or more laser sources which emit a plurality of laser beams, an optical system which makes the plurality of laser beams enter the optical fiber through an end face of the optical fiber, and one of said first reference surface and said second reference surface is formed on one of optical components which constitute the optical system and holders which fix the optical components.

7. A laser apparatus according to claim 6, wherein said plurality of laser beams are emitted from said one or more laser sources as divergent laser beams, said optical components include either of a condensing lens and a set of collimator lenses, the set of collimator lenses collimate the plurality of laser beams emitted from said one or more laser sources, and the condensing lens condenses the plurality of laser beams collimated by the set of collimator lenses so that the plurality of laser beams converges on said end face of the optical fiber.

8. A method for assembling a laser apparatus having,
a main body,
an attachment part on which an adhesion surface and a first reference surface are fonned, where the adhesion surface is flat, the first reference surface is flat and makes a first predetermined angle with the adhesion surface, and the attachment part is either of a holder which fixes an optical component and an optical component into which a laser beam is inputted or from which a laser beam is outputted, and
a fixing member on which a mounting surface and a second reference surface are formed, and which is directly or indirectly fixed to said main body and is arranged to adhesively hold said attachment part at the mounting surface by adhering said adhesion surface to the mounting surface, where the second reference surface is flat and makes a second predetermined angle with the mounting surface;
said method comprising the steps of:
(a) measuring a first angle which said second reference surface makes with a predetermined reference direction after said fixing member is fixed to the main body;
(b) adjusting an orientation of said attachment part while measuring a second angle which said first reference surface makes with said predetermined reference direction; and
(c) adhesively fixing said attachment part to said fixing member when said second angle is equal to an angle predetermined based on said first angle, said first predetermined angle, and said second predetermined angle.

9. A method according to claim 8, wherein said second reference surface and said mounting surface are arranged in parallel, and said first reference surface and said adhesion surface are arranged in parallel, and in step (c), said attachment part is adhesively fixed to said fixing member when said second angle coincides with said first angle.

10. A method according to claim 8, wherein said first angle and said second angle are measured by using a laser autocollimator.

11. A method according to claim 8, wherein said laser apparatus further comprises a single optical fiber, one or more laser sources which emit a plurality of laser beams, an optical system which makes the plurality of laser beams enter the optical fiber through an end face of the optical fiber, and one of said first reference surface and said second reference surface is formed on one of optical components which constitute the optical system and holders which fix the optical components.

12. A method according to claim 11, wherein said plurality of laser beams are emitted from said one or more laser sources as divergent laser beams, said optical components include either of a condensing lens and a set of collimator lenses, the set of collimator lenses collimate the plurality of laser beams emitted from said one or more laser sources, and the condensing lens condenses the plurality of laser beams collimated by the set of collimator lenses so that the plurality of laser beams converges on said end face of the optical fiber.

13. A method according to claim 8, wherein said first reference surface and said second reference surface have an arithmetic average roughness (Ra) smaller than 0.08 micrometers.

14. A method according to claim 13, wherein said second reference surface and said mounting surface are arranged in parallel, and said first reference surface and said adhesion surface are arranged in parallel, and in step (c), said attachment part is adhesively fixed to said fixing member when said second angle coincides with said first angle.

15. A method according to claim 12, wherein the first angle and the second angle are measured by using a laser autocollimator.

16. A method according to claim 12, wherein said laser apparatus further comprises a single optical fiber, one or more laser sources which emit a plurality of laser beams, an optical system which makes the plurality of laser beams enter the optical fiber through an end face of the optical fiber, and one of said first reference surface and said second reference surface is formed on one of optical components which constitute the optical system and holders which fix the optical components.

17. A method according to claim 16, wherein said plurality of laser beams are emitted from said one or more laser sources as divergent laser beams, said optical components include either of a condensing lens and a set of collimator lenses, the set of collimator lenses collimate the plurality of laser beams emitted from said one or more laser sources, and the condensing lens condenses the plurality of laser beams collimated by the set of collimator lenses so that the plurality of laser beams converges on said end face of the optical fiber.

* * * * *